United States Patent [19]

Hayashi

[11] Patent Number: 5,345,834

[45] Date of Patent: Sep. 13, 1994

[54] VELOCITY-REDUCED DRIVE SYSTEM

[75] Inventor: Katsuhiko Hayashi, Hara, Japan

[73] Assignee: Kabushiki Kaisha Sankyo Seiki Seisakusho, Nagano, Japan

[21] Appl. No.: 920,385

[22] PCT Filed: Dec. 25, 1991

[86] PCT No.: PCT/JP91/01753

§ 371 Date: Aug. 19, 1992

§ 102(e) Date: Aug. 19, 1992

[87] PCT Pub. No.: WO92/12363

PCT Pub. Date: Jul. 23, 1992

[30] Foreign Application Priority Data

Jan. 8, 1991 [JP] Japan ............... 3-003041[U]

[51] Int. Cl.$^5$ ............... F16H 1/12; F16H 57/02
[52] U.S. Cl. ............... 74/421 A; 74/425; 74/606 R
[58] Field of Search ............... 74/89.14, 425, 421 R, 74/421 A, 606 R, 420

[56] References Cited

U.S. PATENT DOCUMENTS

| | | | |
|---|---|---|---|
| 2,225,957 | 12/1940 | Korff | 74/421 A X |
| 2,974,409 | 3/1961 | Ghinazzi | 74/421 A X |
| 4,026,163 | 5/1977 | Merkert | 74/425 |
| 4,686,863 | 8/1987 | Inoue et al. | 74/425 |
| 5,128,770 | 7/1992 | Iaana et al. | 358/229 |

FOREIGN PATENT DOCUMENTS

| | | | |
|---|---|---|---|
| 603435 | 9/1934 | Fed. Rep. of Germany | 74/421 A |
| 2240640 | 2/1974 | Fed. Rep. of Germany | 74/425 |
| 51-21256 | 6/1976 | Japan. | |
| 53-8472 | 1/1978 | Japan. | |
| 55-133647 | 10/1980 | Japan. | |
| 57-167551 | 10/1982 | Japan. | |
| 59-136028 | 9/1984 | Japan. | |
| 63-152952 | 10/1988 | Japan. | |
| 64-74342 | 3/1989 | Japan. | |
| 2-96064 | 7/1990 | Japan. | |
| 54577 | 4/1921 | United Kingdom | 74/425 |
| 720725 | 12/1954 | United Kingdom | 74/421 A |

OTHER PUBLICATIONS

Abart Gear & Machine Co., pp. 2, 3, and 10–21, 1924.

*Primary Examiner*—Leslie A. Braun
*Assistant Examiner*—David W. Laub
*Attorney, Agent, or Firm*—Oblon, Spivak, McClelland, Maier & Neustadt

[57] ABSTRACT

A velocity-reduced drive system (1) is used to operate a movable member of a video camera or a combined camera-and-VTR unit at a reduced velocity. The drive system comprises a micro or flat motor (5) supported in cases (2), (3) and (4), a worm gear (6) rotatably supported by the cases, a worm wheel meshed with the worm gear, first power transmission means (11), (12) and (12) for transmitting rotational force of the motor (5) to the worm gear (6), and second power transmission means (14), (15) and (16) for transmitting rotational force of the worm gear (6) to an output shaft (7) to be coupled to the movable member.

8 Claims, 17 Drawing Sheets

FIG. 7b
FIG. 7a
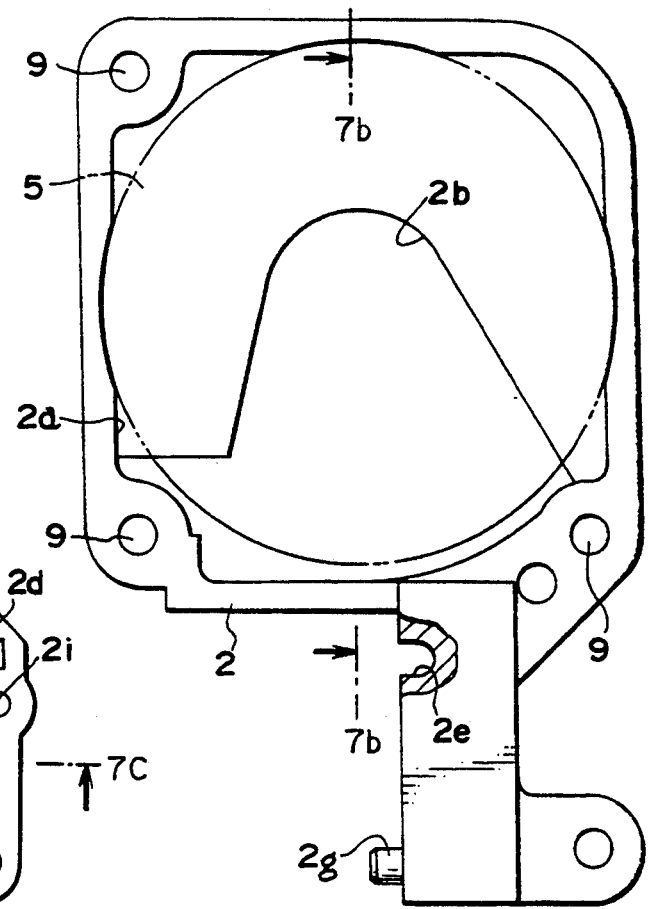
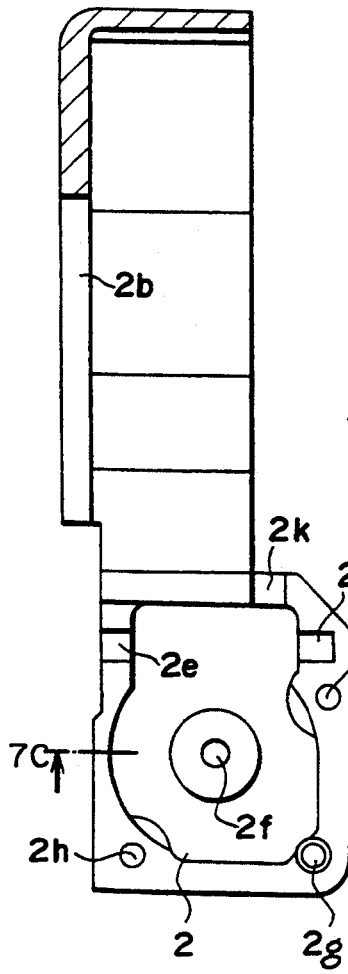
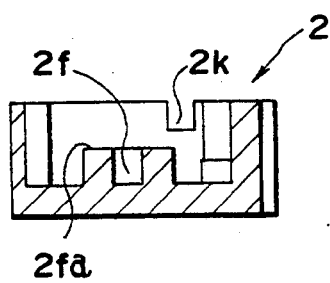
FIG. 7c

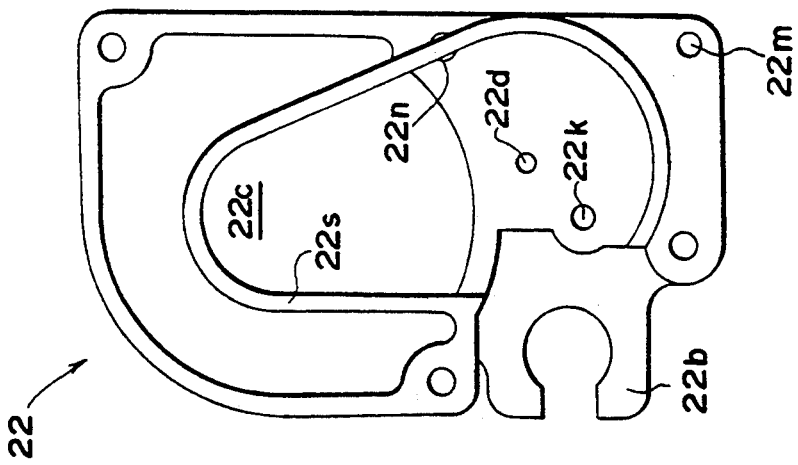
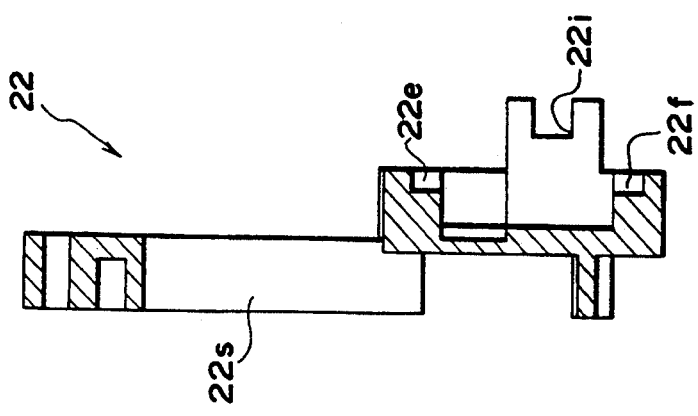
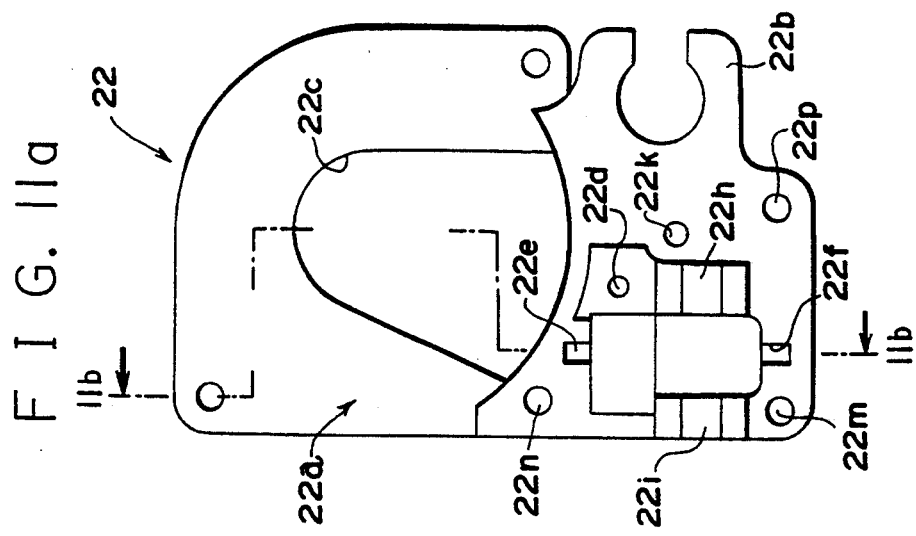

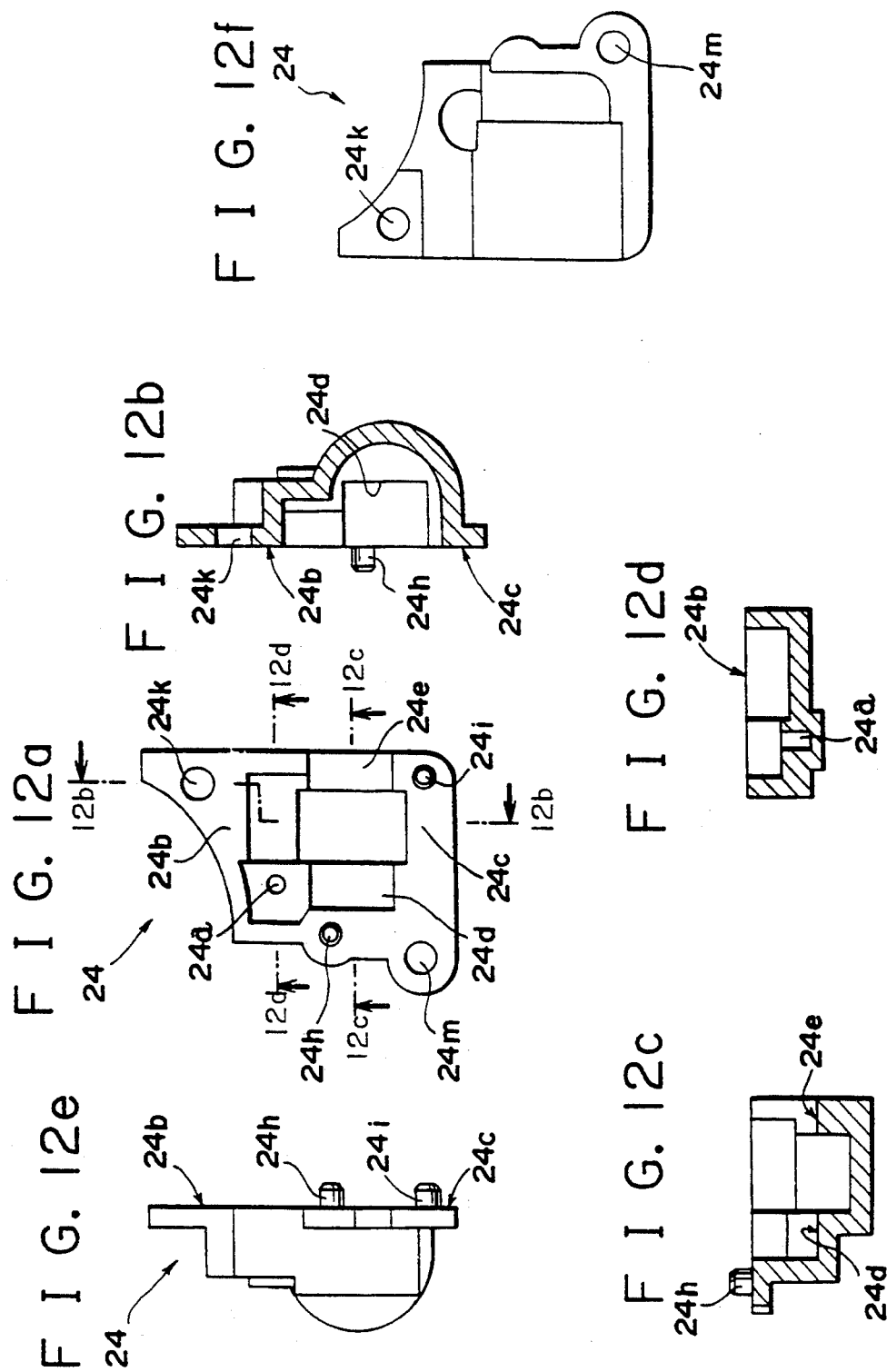

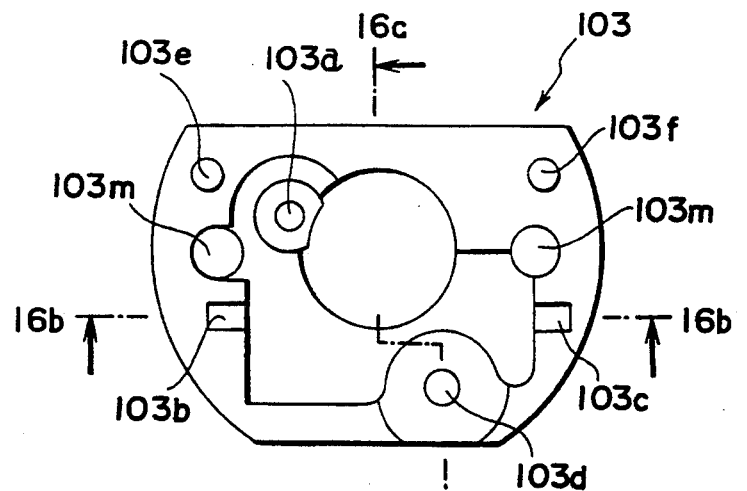
F I G. 16a
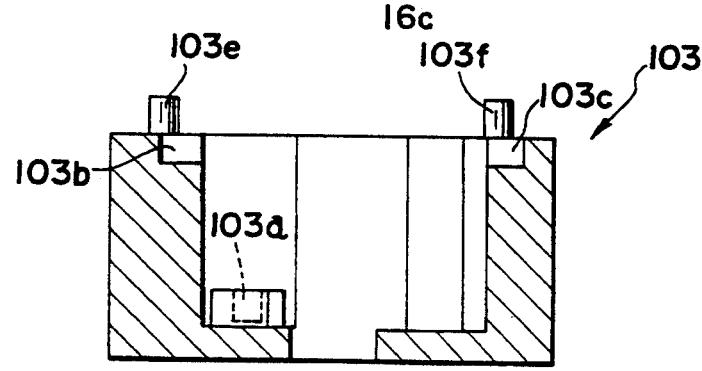
F I G. 16b
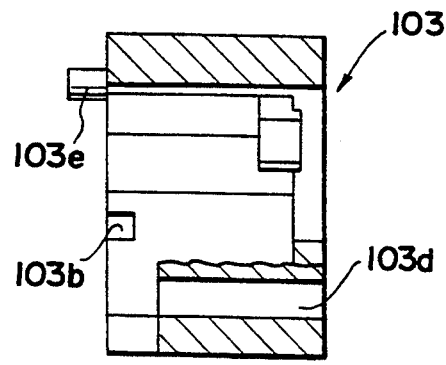
F I G. 16c

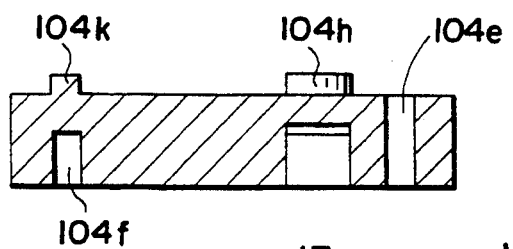
FIG. 17b
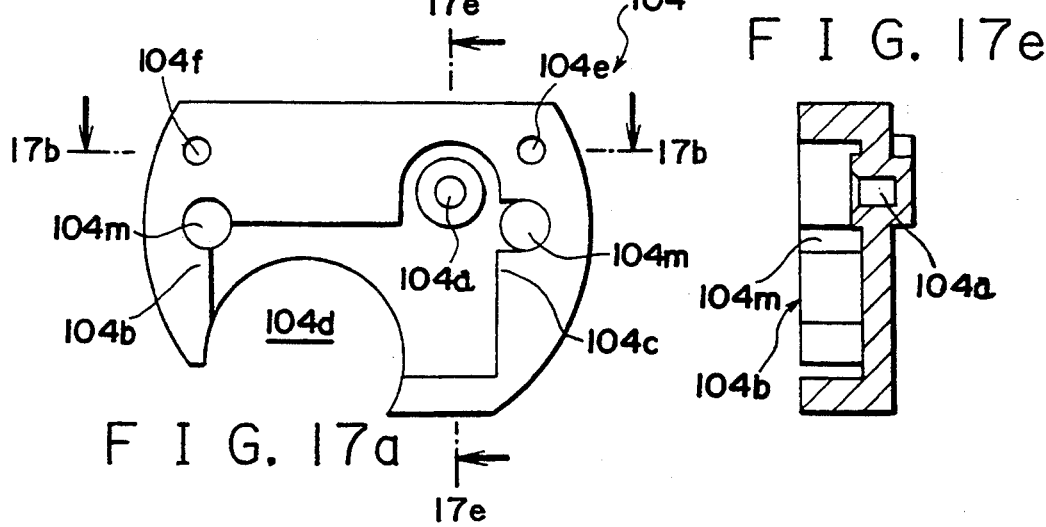
FIG. 17a
FIG. 17e
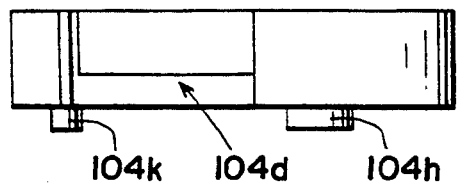
FIG. 17c
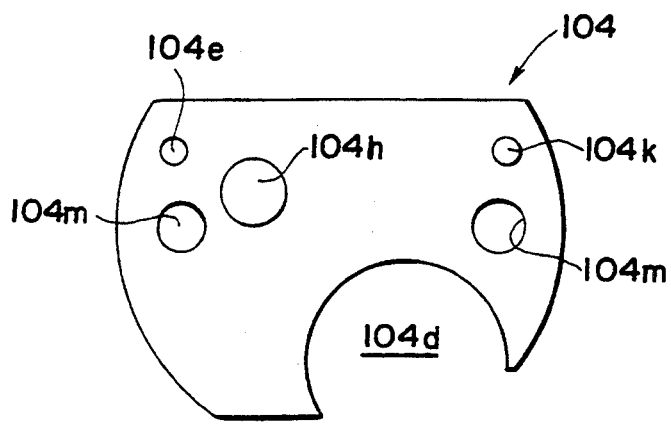
FIG. 17d

1

VELOCITY-REDUCED DRIVE SYSTEM

BACKGROUND OF THE INVENTION

1. Field of the Invention

This invention relates to a velocity-reduced drive system, and more particularly to a small or flat velocity-reduced drive system for operating a small device like a video camera or a combined camera-and-video-tape-recorder unit by reducing the velocity of a motor.

2. Description of the Related Art

It is necessary to reduce the velocity of a motor for a lens driving unit when such unit is operated for focusing or zooming a video camera or a combined camera-and-video-tape-recorder unit (hereinafter called camera-and-VTR unit). One of such velocity-reduced drive systems was proposed in Japanese Patent Laid-Open Publication No. 74342/1989. With the cited system, the velocity of the motor is reduced by a reduction gear train or by combination of the reduction gear train and a pulley-belt unit. A drive shaft of the motor and an output shaft are positioned in the same direction.

Conventionally, the motor and a case for the reduction gear unit are piled with the drive shaft and the output shaft facing in the same direction. Therefore, the drive shaft inevitably becomes longer. The reduction gear train includes a plurality of spur gears, which generate relatively high sounds. Such high sounds are picked up by a microphone of the video camera, being reproduced as noises. Since the direction of the output shaft is limited, the velocity-reduced drive system would have narrower application fields. Further, a number of the spur gears have to be used to obtain large velocity reductions, which means increase of component parts.

When the velocity-reduced drive system is used to operate a cylindrical movable member (e.g. a lens barrel of a combined camera-and-VTR unit), there would be formed an undesired space around the flat surface of the drive system and the cylindrical member.

SUMMARY OF THE INVENTION

It is therefore an object of this invention to provide a velocity-reduced drive system which is compact, being able to obtain large velocity reductions, and to suppress noises.

A further object of the invention is to provide a velocity-reduced drive system which is suitable for operating a movable member of a video camera or a combined camera-and-VTR unit.

A still further object of the invention is to provide a velocity-reduced drive system which is suitable to operate a cylindrical movable member, being compact to save a useless space between the drive system and the cylindrical movable member.

According to the invention, there is provided a velocity-reduced drive system comprising: a micro or flat motor for producing a relatively large torque and mounted in a case, and a reduction gear unit. The reduction gear unit includes a worm gear, a first power transmission means for transmitting rotational force of the motor to the worm gear, a worm wheel meshed with the worm gear, and a second power transmission means for transmitting rotational force of the worm gear to an output shaft.

The output shaft has a coupling member via which it is coupled to a movable member to be operated at a reduced velocity.

When the drive system is applied to a movable member such a lens barrel of a video camera, the drive shaft of the motor is positioned in parallel with the worm gear. With respect to a plane formed by the first power transmission means, the motor is remote from the movable member, and a reduction gear unit is near the movable member. Further, the motor and the reduction gear unit are arranged along an imaginary circumference whose center agrees with the movable member.

Rotational force of the motor is reduced its velocity while it is being transmitted to a destination, i.e. the movable member, via the first power transmission means, worm gear, worm wheel, second power transmission means, and output shaft.

BRIEF DESCRIPTION OF THE DRAWINGS

FIG. 7(a) is a front view of a first case;

FIG. 7(b) is a cross-sectional view taken along line 7b—7b of FIG. 7(a);

FIG. 7(c) is a cross-sectional view taken along line 7c—7c of FIG. 7(b);

FIG. 11(a) is a rear view of a first case;

FIG. 11(b) is a cross-sectional view taken along line 11b—11b of FIG. 11(a);

FIG. 11(c) is a front view of the first case;

FIG. 12(a) is a front view of the second case;

FIG. 12(b) is a cross-sectional view taken along line 12b—12b of FIG. 12(a);

FIG. 12(c) is a cross-sectional view taken along line 12c—12c of FIG 12(a);

FIG. 12(d) is a cross-sectional view taken along line 12d—12d of FIG. 12(a);

FIG. 12(e) is a left-side elevational view of the second case;

FIG. 12(f) is a rear view of the second case;

FIG. 16(a) is a plan view of a first case;

FIG. 16(b) is a cross-sectional view taken along line 16b—16b of FIG. 16(a);

FIG. 16(c) is a cross-sectional view taken along line 16c—16c of FIG. 16(a);

FIG. 17(a) is a bottom view of a second case;

FIG. 17(b) is a cross-sectional view taken along line 17b—17b of FIG. 17(a);

FIG. 17(c) is a front sectional view of the second case;

FIG. 17(d) is a plan view of the second case;

FIG. 17(e) is a cross-sectional view taken along line 17e—17e of FIG. 17(a);

DETAILED DESCRIPTION

Figure 1:
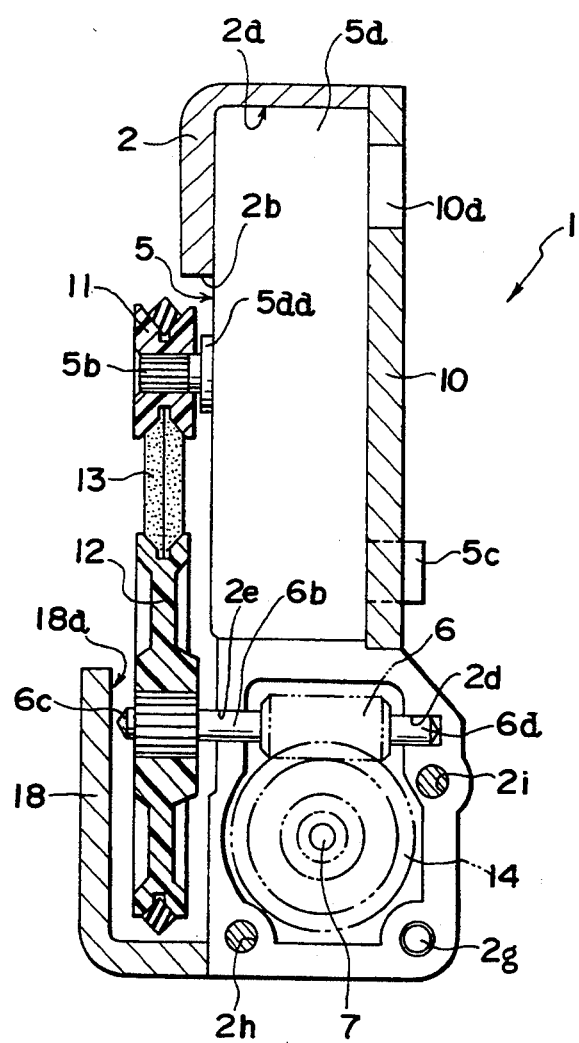
FIG. 1 is a cross-sectional view of a velocity-reduced drive system according to a first embodiment of the invention, taken along line 1—1 of FIG. 2.

FIGS. 1 to 7 show a velocity-reduced drive system according to a first embodiment of the invention. The velocity-reduced drive system 1 (hereinafter called "drive system 1") comprises first to third cases 2, 3, 4, a flat motor 5, a worm gear 6, an output shaft 7, a first power transmission means, and a reduction gear train 8 as a second power transmission means. The motor 5 is housed in the first case 2 (FIG. 7). The worm gear 6 is rotatably supported by the first and second cases 2, 3. The output shaft 7 is rotatably supported by the first and third cases 2, 4. The first power transmission means transmits rotational force of the motor to the worm gear 6. The reduction gear train 8 rotatably couples the output shaft 7 and worm gear 6.

The motor 5 includes a drive shaft 5b received in a bearing 5aa fixed to a motor case 5a. The motor case 5a is made of magnetic material, having a fold 5c (only one is shown in FIG. 1), which is inserted through a base plate 10 of magnetic material, being bent to be fixed on the base plate 10.

A circular coil and a commutator which are hardened by synthetic resin are attached to the drive shaft 5b. A magnet and a brush are fixed on the base plate 10. A terminal integral with a brush holder (not shown) projects through a hole 10a of the base plate 10. Part of the base plate 10 is used as a motor case. The motor 5 is mounted on a motor space 2a in the first case 2.

Figure 6:
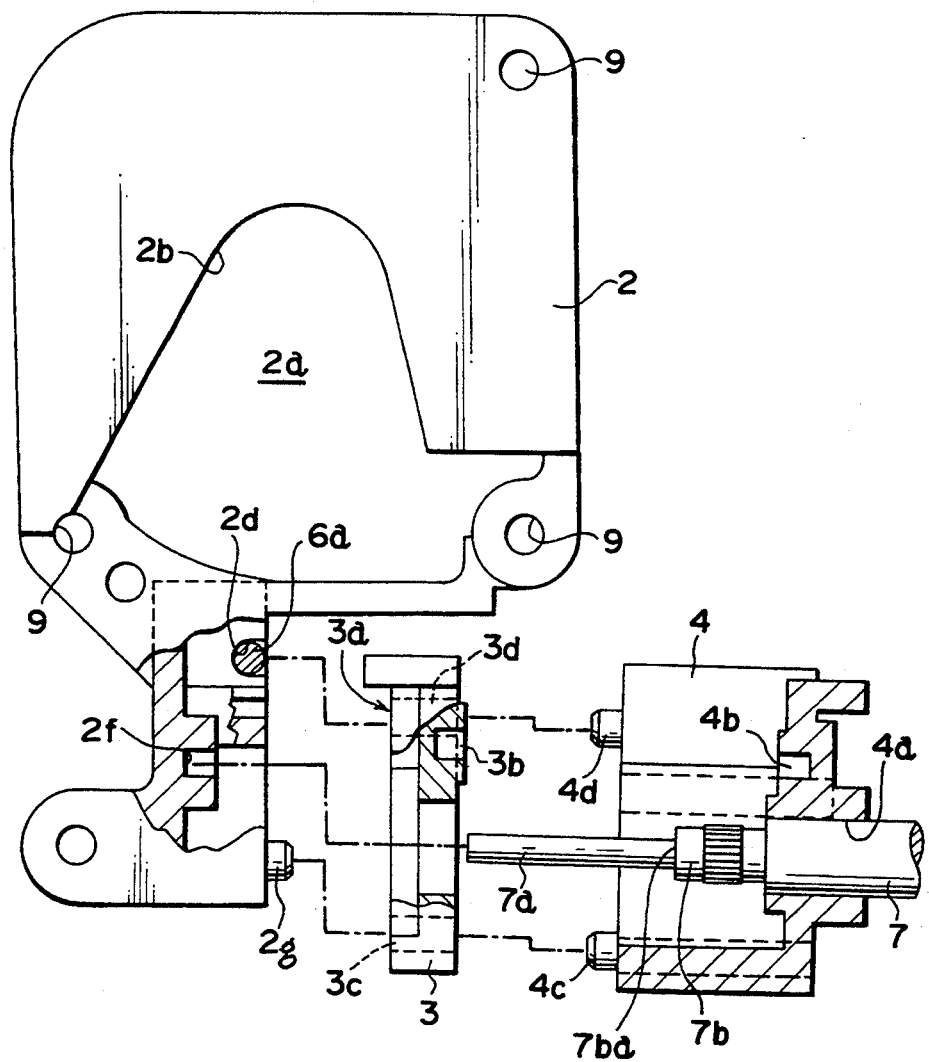
FIG. 6 is a front view of the cases and output shaft, in exploded form.
Figure 8:
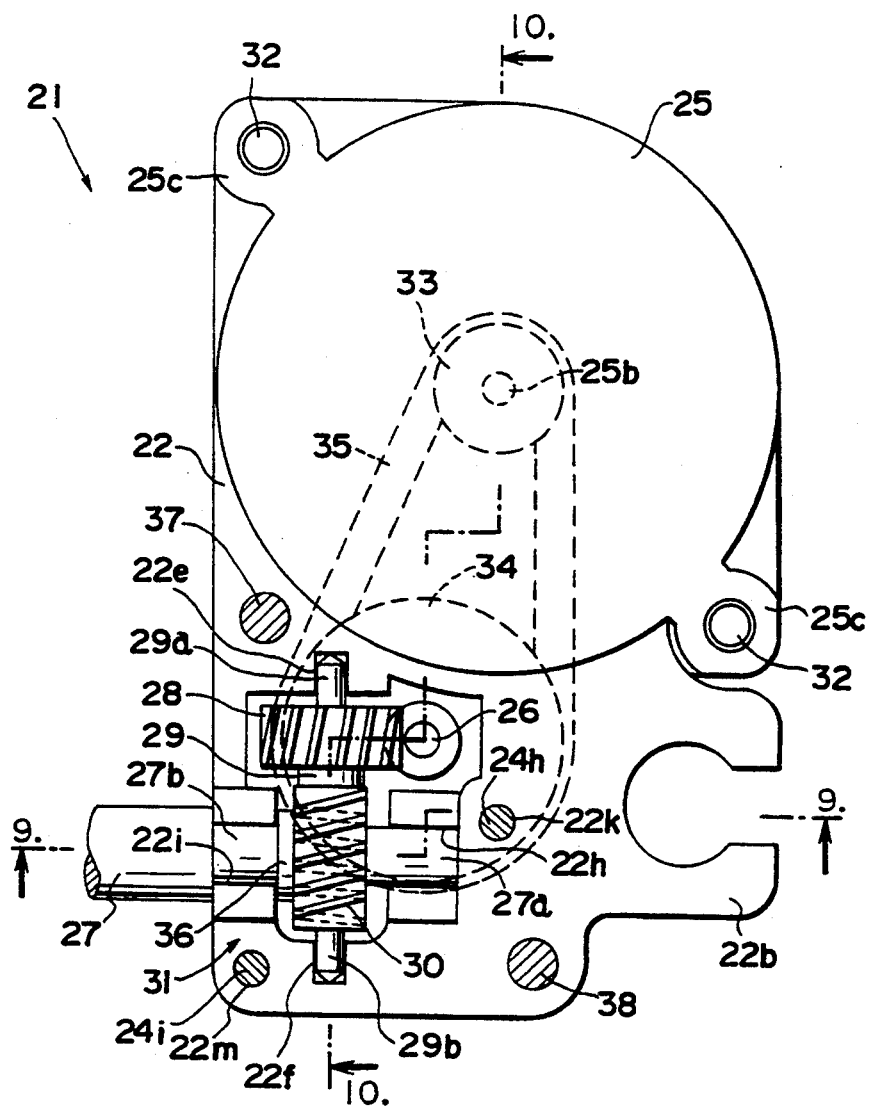
FIG. 8 is a rear view of a velocity-reduced drive system according to a second embodiment of the invention, with a second case removed.
Figure 9:
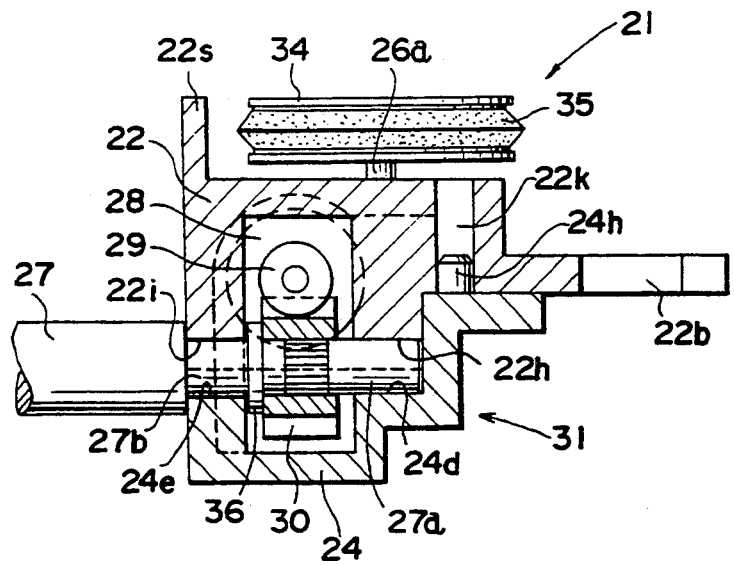
FIG. 9 is a cross-sectional view taken along line 9—9 of FIG. 8.
Figure 10:
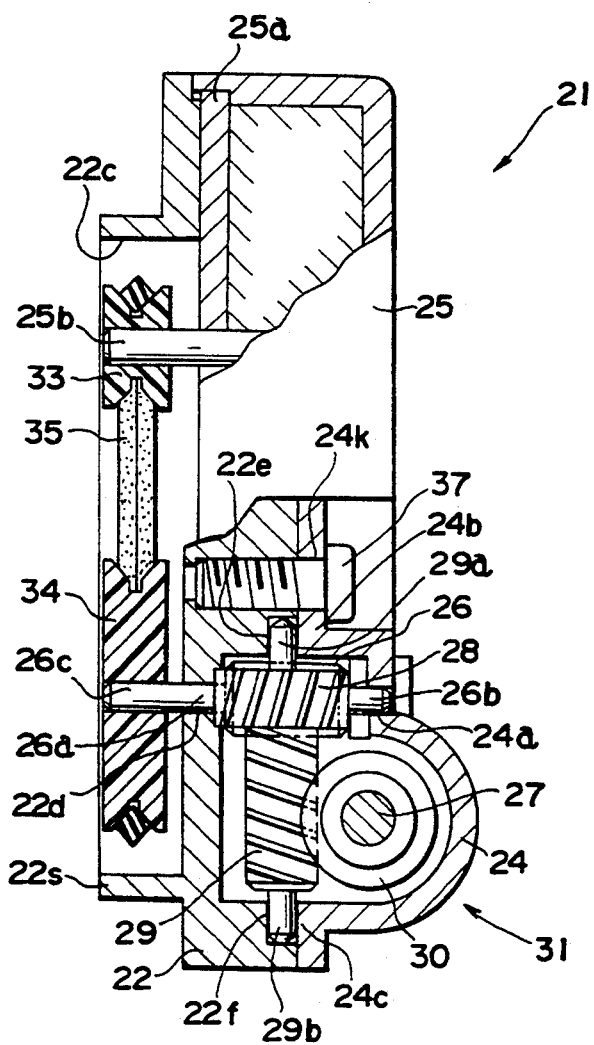
FIG. 10 is a cross-sectional view taken along line 10—10 of FIG. 8.

The base plate 10 is fastened to the first case 2 by screws (not shown) in screw holes 9 (shown in FIGS. 6 and 7). The base plate 10 has a coupling member 10b which is used to couple the drive system 1 to a body of a video camera, for example.

The drive shaft 5b projects from the motor 5 through a window 2b of the first case 2. A small drive pulley 11 is tightly fitted over the projecting end of the drive shaft 5b.

The worm gear 6 is in parallel with the drive shaft 5b, having one end 6a received in a bearing hole 2d and the other end 6b received in a bearing groove 2e of the first case 2. The ends 6a, 6b are covered by a flat bearing cover 3a (shown in FIGS. 5, 6) of the second case 3, so that the worm gear 6 is rotatably supported by the first and second cases 2, 3. The opposite ends of the worm gear 6 are conical to decrease a frictional resistance in the bearing hole 2b or the bearing groove 2e during the forward or backward rotation.

One end of the worm gear 6 projects from the first case 2, carrying a large driven pulley 12 tightly fitted thereon. The driven pulley 12 serves to reduce the velocity of the motor 5. An endless belt 13 is wound around the driven pulley 12 and the drive pulley 11. The pulleys 11, 12 and the endless belt 13 constitute the first power transmission means for transmitting the rotational force of the motor 5 to the worm gear 6.

A worm wheel 14 is meshed with the worm gear 6, being is rotatably supported over a small diameter portion 7a of the output shaft 7. The output shaft 7 is rotatably supported in a bearing hole 2f of the first case 2 and a bearing hole 4a of the third case 4. The worm wheel 14 has a small spur gear 14a as an integral part.

Figure 3:
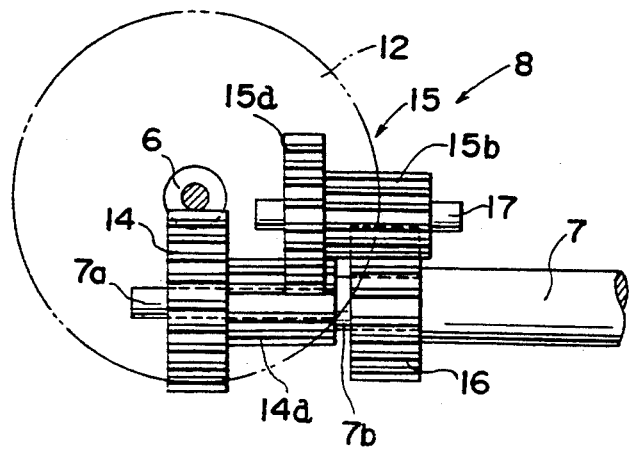
FIG. 3 is a front view of a gear train between a worm and an output shaft.

The reduction gear train 8 functions as the second power transmission means to transmit the rotational force of the worm gear 6 to the output shaft 7, including the worm wheel 14, reduction gear 15, and a spur gear 16 as shown in FIG. 3. The spur gear 16 is tightly fitted over the portion 7b of the output shaft 7. The reduction gear 15 is meshed with the small spur gear 14a of the worm wheel 14.

Axial movement of the worm wheel 14 is controlled by an end surface 2fa of a sleeve forming the bearing hole 2f of the first case 2 and by a step 7ba of the portion 7b of the output shaft 7b.

The reduction gear 15 is rotatably supported around a shaft 17, which is rotatably supported with its opposite ends respectively received in a hole 3b of the second case 3, and a hole 4b of the third case 4 (FIG. 6). As shown in FIG. 3, the reduction gear 15 is a double gear, having a large spur gear 15a and a small spur gear 15b. The large spur gear 15a is meshed with the small spur gear 14a, while the small spur gear 15b is meshed with the spur gear 16.

The cases 2, 3, 4 for supporting the worm gear 6, worm wheel 14 and reduction gear train 8 are fastened one another as shown in FIG. 6. Specifically, the third case 4 is fastened to the second case 3 by engaging pins 4c, 4d of the third case 4 with through holes 3c, 3d of the second case 3. Then, the second and third cases 3, 4 are fastened to the first case 2 by engaging a pin 2g of the first case 2 with the through hole 3c of the second case 3. Thereafter, the screws inserted in the through holes (not shown) of the second and third cases 3, 4 are forcibly thrust into screw holes 2h, 2i (FIG. 7) of the first case 2.

Figure 2:
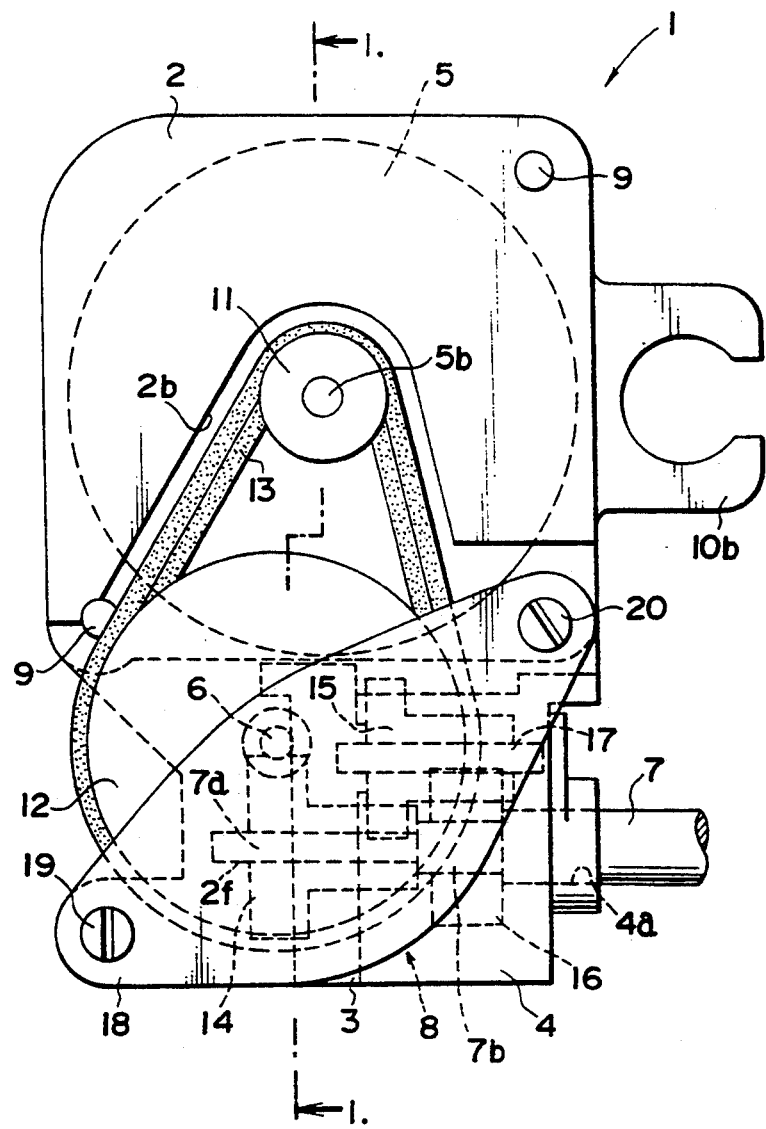
FIG. 2 is a front view of the velocity-reduced drive system of FIG. 1.
Figure 4:
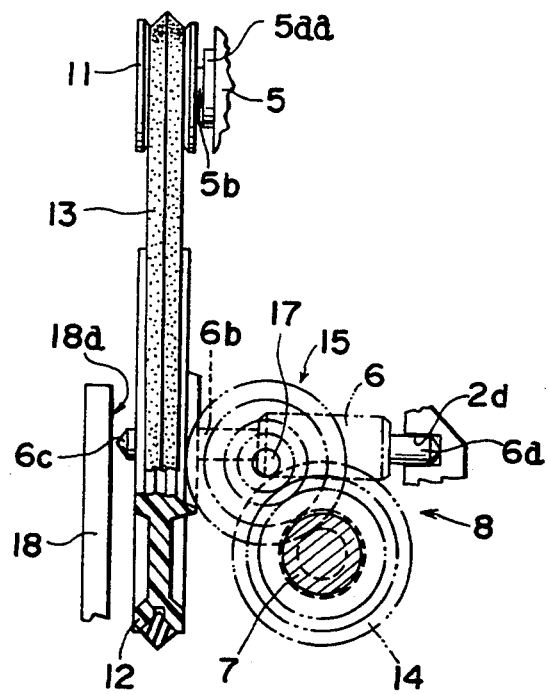
FIG. 4 is a side elevational view of a power transmission system between a motor drive shaft and the output shaft.
Figure 5:
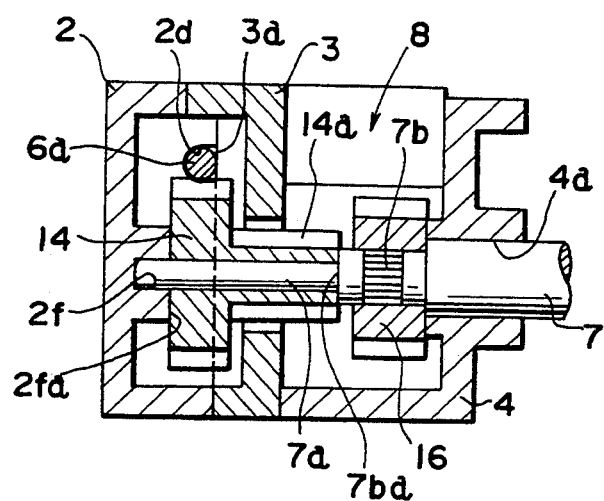
FIG. 5 is a side cross-sectional view of cases for supporting a worm gear, a worm wheel and output shaft.

As shown in FIGS. 1, 2 and 4, a pulley cover 18 is attached to the first case 2 by screws 19, 20 so that the pulley cover 18 confronts with the end 6c of the worm gear 6 and covers the driven pulley 12. Specifically, the pulley cover 18 is located very near the end 6c of the worm gear 6 to minimize the axial movement of the worm gear 6 when it is rotated. The first case 2 has a cut 2k through which a lubrication agent is supplied to the worm gear 6 as shown in FIG. 7.

The drive system 1 will be assembled in the following order. Firstly, the base plate 10 of the motor 5 attached with the drive pulley 11 is fastened to the first case 2 by screws. The worm gear 6 having the driven pulley 12 thereon is placed in a bearing hole 2d and a bearing groove 2e of the first case 2. The second and third cases 3, 4 carrying the output shaft 7 and the reduction gear train 8 in combination are positioned on the first case 2, being fastened by screws. Under this condition, one end of the output shaft 7 is placed in a bearing hole 2f of the first case 2, and the worm wheel 14 is meshed with the worm gear 6. The endless belt 13 is trained around the drive and driven pulleys 11, 12. Since the drive shaft 5b of the motor 5 and the worm gear 6 are in parallel, the endless belt 13 can be easily trained around the pulleys 11, 12. Finally, the pulley cover 18 is attached to the first case 2 by screws.

The following are example of dimension of some main components. The worm gear 6 is approximately 2 mm in the diameter. The worm wheel 14 to be mated with the worm gear 6 is approximately 4.8 mm in the diameter. The case 2 is approximately 23.7 mm long, and approximately 5.9 mm thick including the base plate 10. The motor space in the case 2 is 15 mm×15 mm.

Operation of the drive system 1 will be described hereinafter. When the motor 5 rotates in one direction (e.g. forwardly), the rotational force of the drive shaft 5b is transmitted via the drive pulley 11, endless belt 13, and driven pulley 12 to the worm gear 6, where the velocity of the rotational force has been remarkably reduced. When the worm gear 6 meshed with the worm wheel 14 is rotated, the end 6a of the worm gear 6 is in contact with the bottom of the hole 2d of the first case 2. Rotational force of the worm wheel 14 meshed with the worm gear 6 is further reduced in velocity, being transmitted via the reduction gear train 3 (FIG. 3) to rotate the output shaft 7.

When the motor 5 rotates in the opposite direction (i.e. backwardly), the worm gear 6 meshed with the worm wheel 14 is rotated with its conical end 6c in contact with an inner surface 18a of the pulley cover 18, reducing the rotating velocity of the worm wheel 14.

The motor 5 and the velocity reduction unit are juxtaposed so that the diameter of the driven pulley 12 coupled with worm gear 6 can be made large enough to obtain large velocity reductions between the motor and the worm gear. This means that the reduction gear train 8 is not required to reduce the velocity so extensively, thereby suppressing noises caused by the reduction gear train.

In the foregoing embodiment, the portion 7a of the output shaft 7 is used to rotatably support the worm wheel 14, which decreases the number of component parts.

The flat motor is effective to reduce the size of the whole drive system. The pulley, endless belt, worm gear and worm wheel in combination are also effective to attain large velocity reductions and substantially quiet operation. Combination of the worm gear and the worm wheel enables the output shaft to be positioned as desired, so that the whole drive system can be designed according to a space where the drive system is used.

With the foregoing embodiment, the first case 2 and the motor case 2a are separate members. However, it is also possible to make them as one unit by pressing a sheet metal to form the first case 2 and to stamp the motor space (2a) thereon, thereby decreasing the number of the component parts and facilitating the assembling work.

A velocity-reduced drive system according to a second embodiment will be described with reference to FIGS. 8 to 12. This embodiment is characterized in that a worm gear and a worm wheel are used in place of the spur gears in the reduction gear train 8 of the first embodiment.

The thin drive system 21 comprises coupled first and second cases 22, 24, a flat motor 25, a first worm gear 26, a first power transmission means, a second power transmission means 31, and an output shaft 27. The flat motor 25 put in a motor case 25a is housed in the first case 22 (FIG. 11). The first worm gear 26 and the output shaft 27 are respectively and rotatably supported by the first and second cases 22, 24. The first power transmission means transmits the rotational force of the motor 25 to the first worm gear 26. The second power transmission means 31 includes the first worm gear 26, output shaft 27, worse wheel 28, second worm gear 29 and second worm wheel 30. The first worse wheel 28 rotatably couples the output shaft 27 and the first worm gear 26.

The motor 25 has a drive shaft 25b projecting from the motor case 25a. The motor case 25a is attached on a motor space 22a of the first case 22 with members 25c fastened by a pair of screws 32. The first case 22 has a coupling member 22b for attaching the drive system to a combined camera-and-VTR unit, for example.

One end of the drive shaft 25b projects through a window 22c of the first case 22, having a small drive pulley 33 tightly fitted therearound.

Opposite ends 26a, 26b of the first worm gear 26, which is in parallel to the drive shaft 25b, are respectively received in bearing holes 22d, 24a of the first and second cases 22, 24, so that the worm gear 26 is rotatably supported by the cases 22, 24. The end 26b of the first worm gear 26 is conical to reduce the frictional resistance during the rotation of the worm gear 26.

A large driven pulley 34 for velocity reduction is tightly fitted over an end 26c of the worm gear 26 extending through the bearing hole 22d. An endless belt 35 is trained around the drive and driven pulleys 33, 34. The drive and driven pulleys 33, 34 and the endless belt 35 constitute the first power transmission means for transmitting the rotational force of the motor 25 to the first worm gear 26.

The first case 22 has a protector 22s for protecting the pulleys 33, 34 and the endless belt 35.

The first worm wheel 28 meshes with the first worm gear 26. The worm wheel 28 is tightly fitted over one end 29a of a second worm gear 29. The second worm gear 29 is rotatably supported by the first case 22 with opposite ends 29a, 29b received in bearing holes 22e, 22f and covered by bearing covers 24b, 24c of the second case 24. The ends 29a, 29b of the second worm gear 29 are conical to decrease the frictional resistance during the rotation of the worm gear 29.

Tightly fitted over a knurled portion of the output shaft 27, the second worm wheel 30 is meshed with the second worm gear 29. The first worm wheel 28, second worm gear 29 and second worm wheel 30 constitute the second power transmission means for transmitting the rotational force of the first worm gear 26 to the output shaft 27.

The output shaft 27 is rotatably supported by the first and second cases 22, 24 with the small diameter portions 27a, 27b thereof received in bearing grooves 22h, 22i of the first case 22 and covered by bearing covers 24d, 24e of the second case 24.

A spacer 36 is fitted over the output shaft 27 at its portion between the second worm wheel 30 and the bearing hole 22i of the first case 22. The output shaft 27 is attached over its end (not shown) a pinion gear for operating a focusing ring, for example.

The second case 24 is fastened to the first case 22 by fitting projections 24h, 24i thereof into holes 22k, 22m of the first case 22, and fitting screws 37, 38, (which are inserted in through holes 24k, 24m), into holes 22n, 22p of the first case 22.

In operation, when the motor 25 is rotated in one direction, the rotational force of the motor 25 is transmitted via the drive pulley 33, belt 35 and driven pulley 34 to the first worm gear 26, which receives the rotational force having a reduced velocity. The first worm gear 26 sends its mating first worm gear 28 its rotational force having a largely reduced velocity, thereby rotating the first worm gear 29 integral with the worm wheel 28. The second worm gear 29 rotates its mating second worm wheel 30 at a very reduced velocity, which rotates the output shaft 27 integral therewith.

The drive system of this embodiment is as advantageous as the drive system of the foregoing embodiment. In addition, this drive system can enlarge a range to install the output shaft, obtain large velocity reductions, and suppress noises caused by the reduction gear train.

Figure 13A:
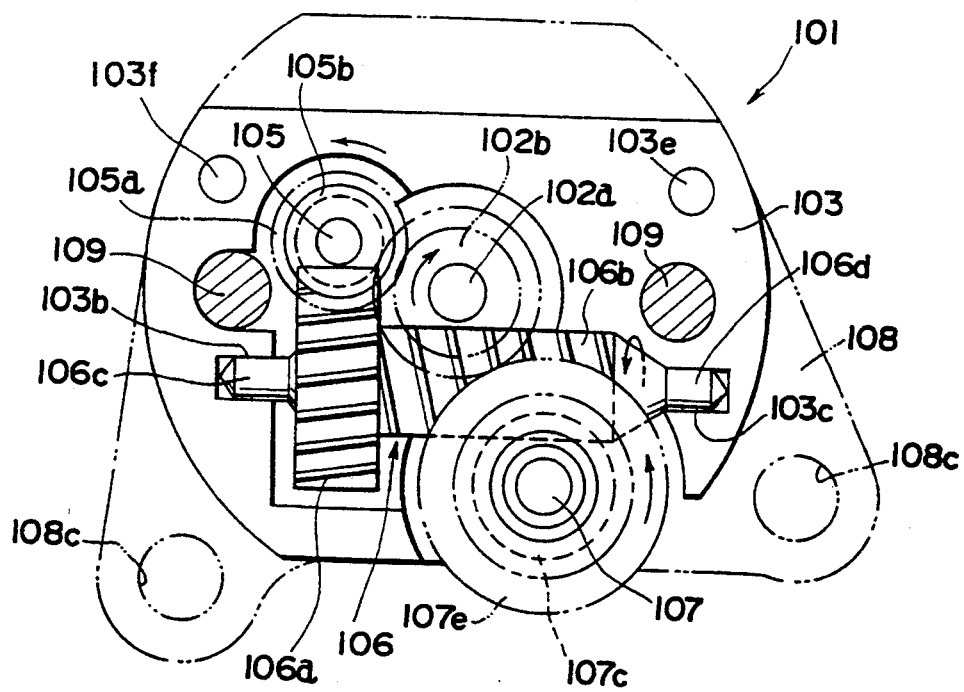
FIG. 13(a) is a plan view showing the internal configuration of a velocity-reduced drive system according to a third embodiment.
Figure 13B:
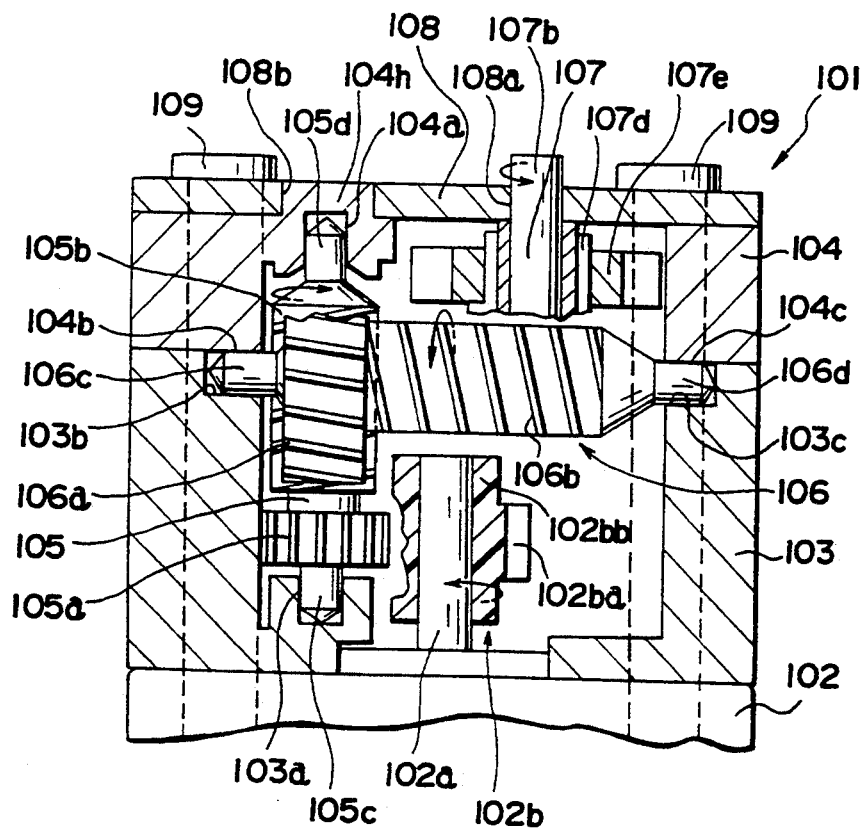
FIG. 13(b) is a front sectional view of the velocity-reduced drive system of FIG. 13(a)
Figure 14:
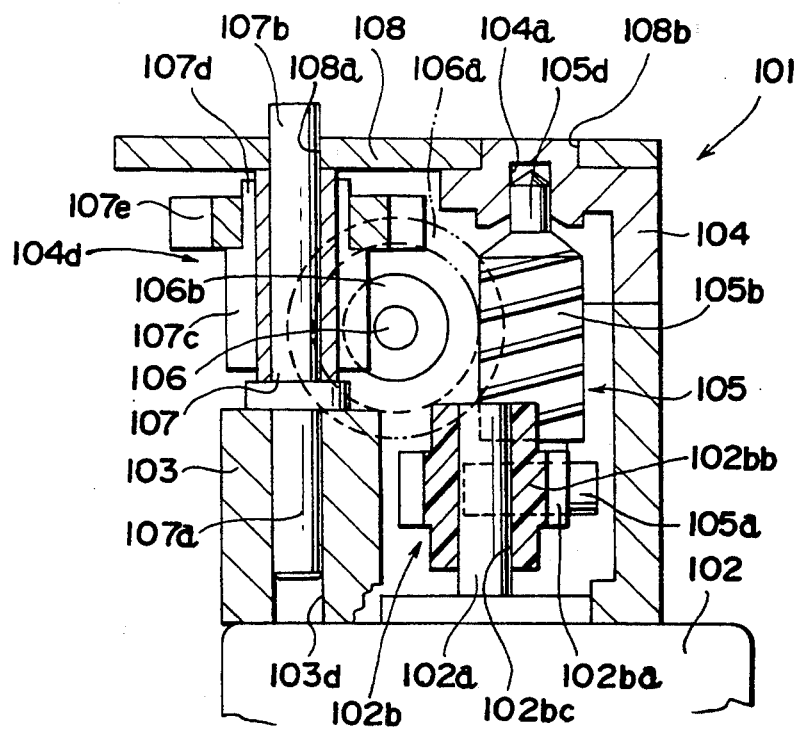
FIG. 14 is a side elevational view of the velocity-reduced drive system of FIG. 13(a)

FIGS. 13 to 17 show a velocity-reduced drive system of a third embodiment of the invention. As shown in FIG. 13 and 14, the drive system 101 comprises a micro motor 102 (only partially shown), first and second cases 103, 104, a first worm shaft 105, a second worm shaft 106, and an output shaft 107. The first and second worm shafts 105, 106 are rotatably supported by the first and second cases 103, 104.

The motor 102 is fastened to the first case 103 by screws 109 which are inserted through a case cover 108 and through the second and first cases 104, 103.

The motor 102 has axially a long oval shape, including a drive shaft 102a projecting into the first case 103. An input gear 102b made of synthetic resin is tightly fitted over the drive shaft 102a (to be described later).

The first worm 105 shaft has, as integral parts, a spur gear 105a to be meshed with the input gear 102b, and a first worm gear 105b. The first worm shaft 105 is rotatably supported by the first and second cases 103, 104 with opposite ends 105c, 105d thereof respectively received in a bearing hole 103a of the first case 103 (FIG. 16) and a bearing hole 104a of the second case 104 (FIG. 17). The input gear 102b and the spur gear 105a constitute a first power transmission means for transmitting the rotational force of the motor 102 to the first worm gear 105b.

Figure 15:
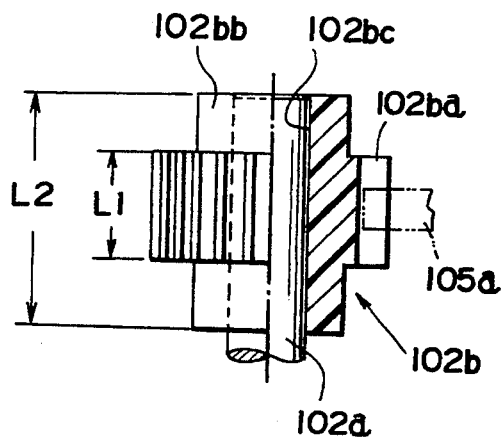
FIG. 15 is a cross-sectional view showing part of an input gear fitted over the drive shaft.

The configuration of the input gear 102b will be described referring to FIG. 15. The input gear 102b is made of synthetic resin, having a toothed portion 102ba to be meshed with the spur gear 105a, and a hub 102bb. The length L2 of the hub 102bb, i.e. the whole length of the input gear 102b, is larger than the width L1 of the toothed portion 102ba. For example, the input gear 102b has the following dimension: approximately 3.2 mm in the diameter, approximately 1.4 mm in the width L, approximately 3.2 mm in the whole length L2, and approximately 2 mm in the hub diameter. The input gear 102b is tightly fitted over the drive shaft 102a (approximately 1 mm in the diameter) via the center hole 102bc thereof. The input gear 102b is lengthened so that it is more tightly fitted over the drive shaft 102a of the motor 102 and is not thrust in its rotating direction and axially on the drive shaft 102a. In this embodiment, although the width L1 of the toothed portion is smaller than the length L2 of the hub, it is also possible to make L1 equal to L2 when there is a sufficient space for the input gear 102b.

The second worm shaft 106 has a first worm wheel 106a to be meshed with the first worm gear 105b, and a second worm gear 106b as integral parts. Opposite ends 106c, 106d of the second worm shaft 106 are respectively received in bearing grooves 103b, 103c of the first case 103. These ends 106c, 106d are covered by bearing covers 104b, 104c of the second case 104 (FIG. 17) so that the second worm 106 is rotatably supported by the first and second cases 102, 104.

As shown in FIG. 14, the output shaft 107 is rotatably supported by the first case 103 with opposite ends 107a, 107b thereof respectively received in a bearing hole 103d of the first case 103 and a bearing hole 108a of the case cover 108. A second worth wheel 107c, to be meshed with the second worm gear 106b, is tightly fitted over the output shaft 107 between the first case 103 and the case cover 108, i.e. in a space 104d of the second case 104 (FIG. 17(a)).

The first worm wheel 106a, second worm gear 106b and second worm wheel 107c constitute a second power transmission means for transmitting the rotational force of the first worm gear 105b to the output shaft 107.

A hub on one side of the worm wheel 107c has a key way 107d. The hub is tightly fitted into an output gear 107e. As shown in FIG. 13 and 14, part of the output gear 107e is projected from the cases 103, 104 to be coupled to a tape loading unit (not shown). In this embodiment, the output gear 107e is rotated with the output shaft 107. However, it is also possible to extend one end 107b of the output shaft 107 to receive a pinion as an output gear, which will be rotatably coupled to the device to be operated by the drive system.

The first and second cases 103, 104 are fastened by inserting pins 103e, 103f of the first case 103 (FIG. 16) in positioning holes 104e, 104f of the second case 104 (FIG. 17). The case cover 108 is attached to the second case 104 by fitting a projection 104h (FIG. 17) of the case 104 in a positioning hole 108b (FIGS. 13 and 14) of the case cover 108, and by inserting a pin 104k into a positioning hole (not shown) of the case 104. The case cover 108 has a pair of coupling holes 108c for coupling the drive system 101 to an immovable member such as a body of the video camera, as shown in FIG. 13. In FIG. 16, reference numerals 103m, 104m denote a pair each of through holes into which a pair of fastening screws 109 are (FIG. 13) are inserted.

In operation, when the drive shaft 102a of the motor 102 rotates in the direction shown by the arrow in FIG. 13, the input gear 102b, which is integral with the drive shaft 102a, rotates the first worm 105 as well as the spur gear 105a in the direction shown by the arrow. The rotational force of the first worm shaft 105 is transmitted via the first worm gear 105b and the first worm wheel 106a to the second worm shaft 106, which is then rotated at a reduced velocity in the direction shown by the arrow.

The rotational force of the second worm 106 is transmitted via its second worm gear 106b to the second worm wheel 107c, which receives the rotational force having a reduced velocity, rotating the output shaft 107 integral with the worm wheel 107c at a further reduced velocity in the direction shown by the arrow. The rotational force of the output shaft 107 is transmitted via the output gear 107e to the destination, not shown. When the motor 102 rotates in the opposite direction, all the related members of the drive system are rotated in the opposite directions.

In the foregoing embodiment, the motor and the first worm shaft are rotatably coupled by the spur gears, so that no thrust will be exerted to axially move the drive shaft of the motor. Therefore, the motor can reliably rotate in the forward or backward direction. Since no thrust preventing measures are necessary, the drive system can be simplified. Two sets of the worm gear and worm wheel combination are employed to obtain large velocity reductions, decreasing the number of component parts. The hub of the input gear 102b of the synthetic resin is long enough to be reliably and tightly fitted over the drive shaft 102a of the motor 102, thereby decreasing noises and manufacturing cost of the drive system. These features are very advantageous when the drive system is applied to a small device such as a combined camera-and-VTR unit.

A velocity-reduced drive system of a fourth embodiment will be described hereinafter with reference to FIGS. 18 to 22. The drive system is intended for use with a cylindrical movable member such as a lens barrel of a combined camera-and-VTR unit.

Figure 18:
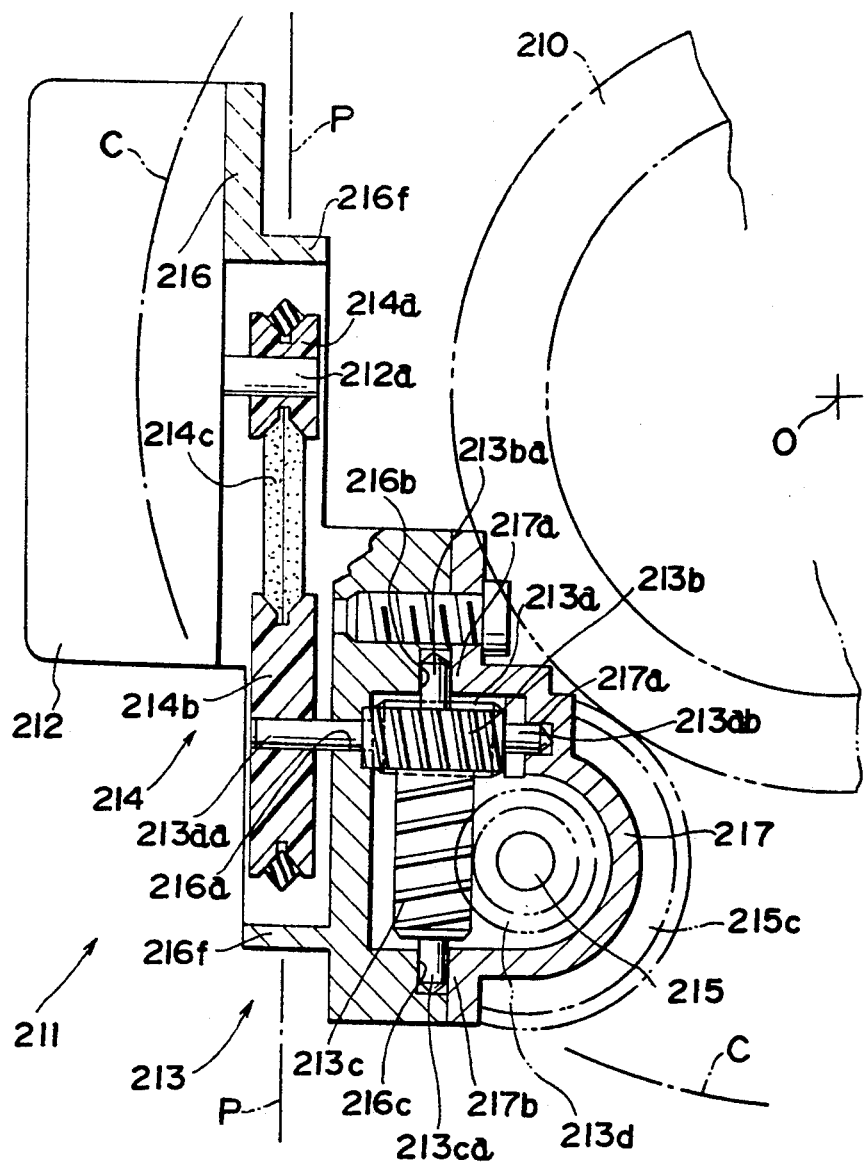
FIG. 18 is a front sectional view of a velocity-reduced drive system according to a fourth embodiment.

As shown in FIG. 18, the drive system 211 is positioned near the lens barrel 210 of the combined camera-and-VTR unit. The drive system 211 comprises a flat motor 212 as a drive source, a reduction gear unit 213, a first power transmission means 214, and an output shaft 215. The first power transmission means 214 transmits the rotational force of the motor 212 to the reduction gear unit 213. The output shaft 215 transmits the rotational force of the reduction gear unit 213 to the lens barrel 210. The reduction gear unit 213 reduces the velocity of the motor 212. In this embodiment, the reduction gear unit 214 includes a first worm gear 213a for receiving the rotational force of the motor 212, and a second power transmission means for transmitting the rotational force of the worm gear 213a to the output shaft 215. The velocity reduction unit 214 will be described in detail later.

The motor 212 is placed on one side of a base plate 216 which is located along a tangent of the lens barrel 210, i.e. on the side opposite to the side confronting the lens barrel 210. A drive shaft 212a of the motor 212 carries a small drive pulley 214a. The base plate 216 serves as part of a case.

The reduction gear unit 213 is rotatably supported by the base plate 212 and a unit case 217 on the base plate 216, being located on the base plate 216 on the side opposite to the motor 212, i.e. on the side confronting the lens barrel 210. The reduction gear unit 213 includes two sets of the worm gear and worm wheel combination.

The reduction gear unit 213 includes a first worm gear 213a formed on the first worm shaft. The first worm shaft is parallel to the drive shaft 212a. The first worm shaft is rotatably supported with its one end 213aa projecting through a bearing hole 216a of the base plate 216, and the other end 213ab thereof received in a bearing hole 217b of the unit case 217. The first worm wheel 213b has a second worm gear 213c as an integral part. The worm gear 213c is meshed with which a second worm wheel 213d. The first worm wheel 213b, second worth gear 213c, and second worth wheel 213d constitute the second power transmission means.

The first worm wheel 213b and the second worm gear 213c are axially integral with each other on the second worm shaft. The second worm shaft is rotatably supported by the base plate 216 and the unit case 217 with ends 213ba, 213ca of the second worm shaft respectively received in bearing grooves 216b, 216c of the base plate 216 and covered by bearing covers 217a, 217b of the unit case 217.

The output shaft 215 is rotatably supported by the unit case 217 and the base plate with a small diameter portion 215a received in bearing grooves 217c, 217d of the unit case 217 and held by bearing covers 216d, 216e of the base plate 216. The second worm wheel 213d, which is meshed with the second worm gear 213c, is tightly fitted over the knurled area of the small diameter portion 215a of the output shaft 215. The end 215b of the output shaft 215 extends toward a toothed portion (not shown) of the lens barrel 210, having a pinion 215c tightly fitted thereon to mesh with the toothed portion.

The first power transmission means 214 includes a small drive pulley 214a, a large driven pulley 214b, and an endless belt 214c. The small drive pulley 214a is tightly fitted over the drive shaft 212a of the motor 212. The large driven pulley 214b is tightly fitted over the end 213aa of the first worm gear 213a. The endless belt 214c is trained around the drive and driven pulleys 214a, 214b.

With respect to a plane P formed by the first power transmission means, i.e. the plane of the base plate 216, the motor 212 is attached, on the base plate 216, on the side opposite to the side where the reduction gear unit 213 is mounted. In other words, the motor 212 is remote from the lens barrel 210 while the reduction gear unit 213 is near the lens barrel 210. Further, the motor 212 and the reduction gear unit 213 are arranged on an imaginary circumference C whose center agrees with the center O of the optical axis of the lens barrel 210. Specifically, the motor 212 and the velocity reduction unit 213 are arranged in the shape of L along the outer circumference of the lens barrel 210 when viewing the lens barrel in the direction of the optical axis (perpendicular to the plane shown in FIG. 18).

Figure 19:
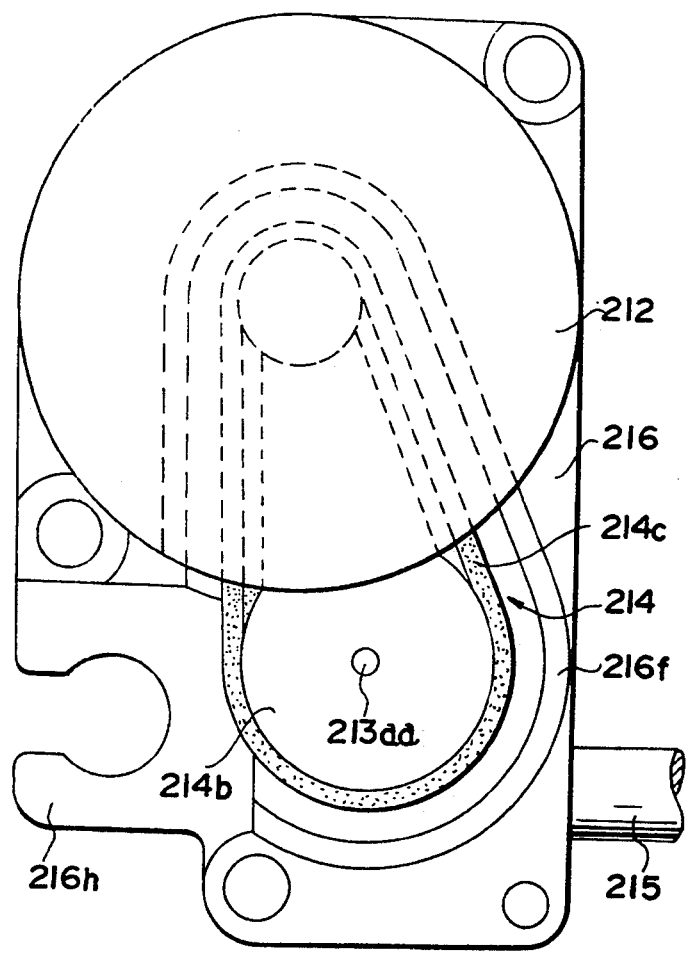
FIG. 19 is a side elevational view of the velocity-reduced drive system of FIG. 18.
Figure 20:
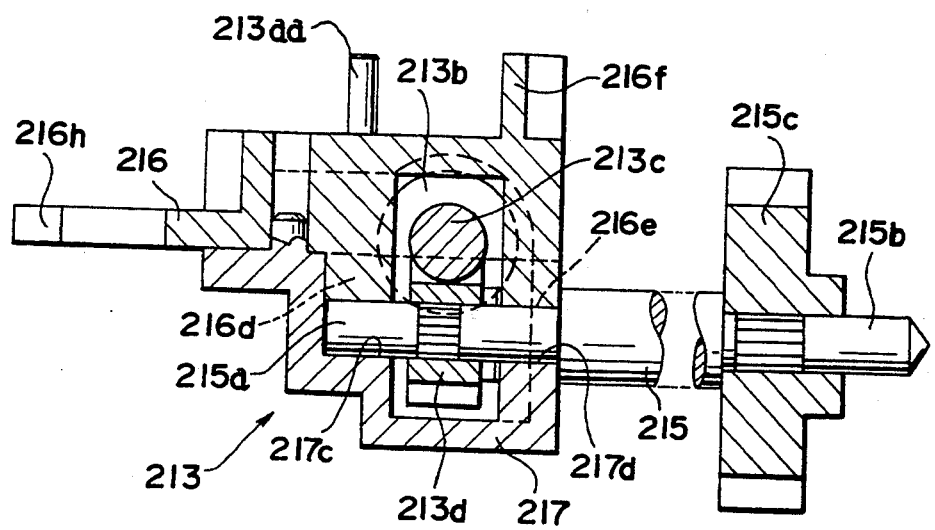
FIG. 20 is a top sectional view of units around a drive shaft of the system of FIG. 18.

The base plate 216 has a protector 216f for enclosing and protecting the endless belt 214c, as shown in FIGS. 18 and 19. The base plate 216 also has a coupling member 216h via which the drive system is coupled to a body of the device such as a video tape recorder as shown in FIGS. 19 and 20.

In operation, when the motor 212 is rotated forwardly or backwardly, rotational force of the motor 212 is transmitted via the first power transmission means 214 to the first worm gear 213a, which receives the rotational force having a reduced velocity. The rotational force of the first worm gear 213a rotates the first worm wheel 213b at a much reduced velocity. The rotational force of the first worm wheel 213b is transmitted to the second worm wheel 213d at a further reduced velocity via the second worm gear 213c integral with the first worm wheel 213b. The second worm wheel 213d rotates the output shaft 215. The rotational force of the output shaft 215 is transmitted via the pinion 215c to operate the lens barrel 210.

In the foregoing embodiment, two sets of the first worm gear 213a and the first worm wheel 213c, and the second worm gear 213c and second worm wheel 213d are employed to obtain large velocity reductions of the motor 212 and assure very quiet operation.

It should be noted that this invention is not limited to the double-worm configuration but is applicable to other configurations. Although the first worm gear 213a in parallel with the drive shaft 212a of the motor 212 and the first worm wheel 213b are indispensable, the components succeeding the second worm gear may be reduction gear trains including spur gears.

Figure 21:
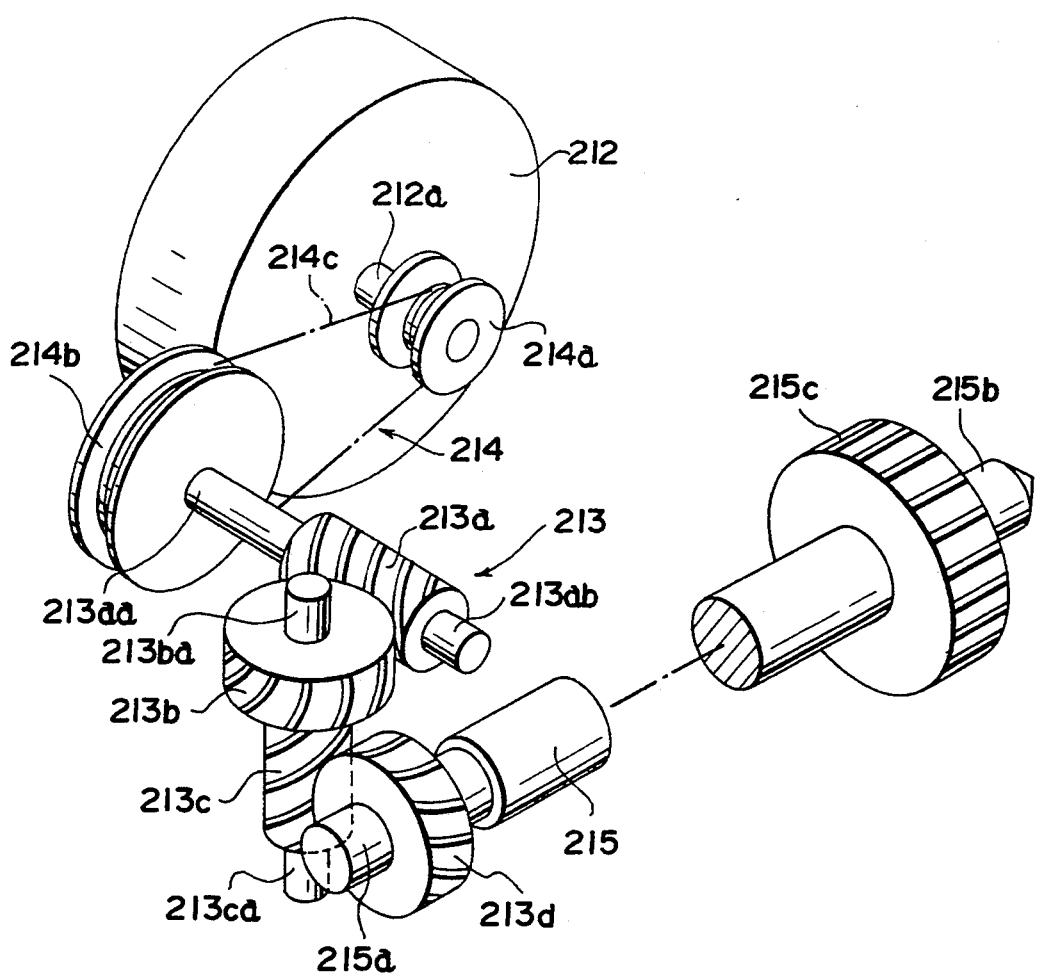
FIG. 21 is a perspective view showing the relationship between a flat motor, reduction gear unit and output shaft.
Figure 22:
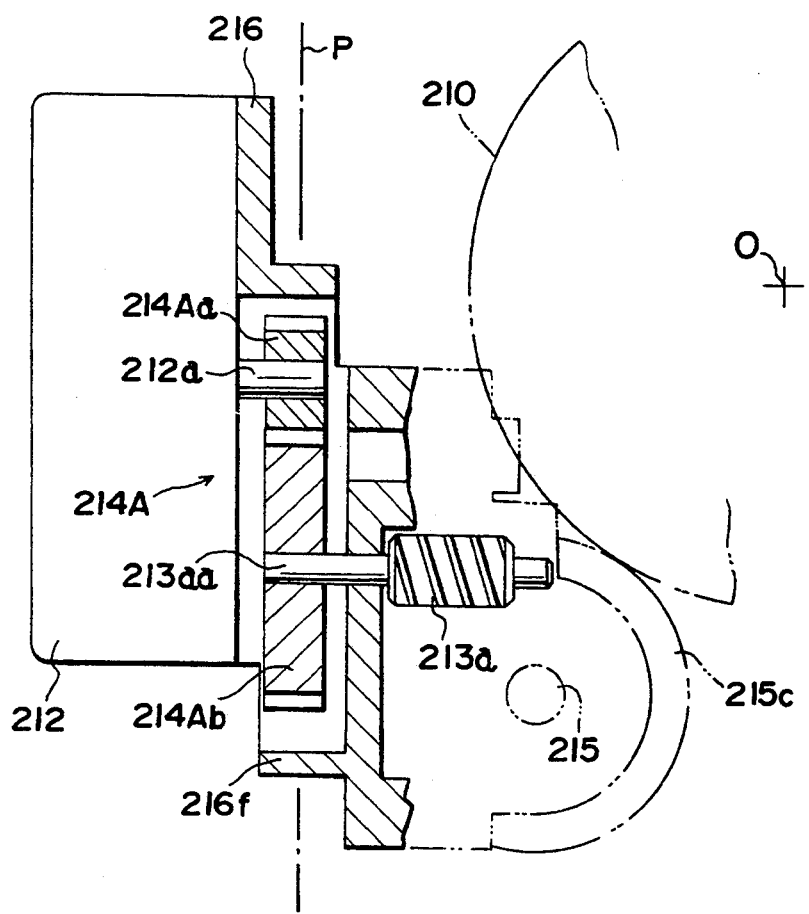
FIG. 22 is a front view showing main parts of a modified example of the fourth embodiment.

As shown in FIG. 22, a reduction gear train 214A may be used as the first power transmission means for transmitting the rotational force of the motor 212 to the velocity reduction unit 213 (FIG. 21). The gear train 214A includes a small drive gear 214Aa tightly fitted over the drive shaft 212a, and a large driven gear 214Ab tightly fitted over the shaft 213aa of the first worm gear 213a. An idle gear may be inserted between the gears 214Aa and 214Ab. In FIG. 22, the components corresponding to or similar to those shown in FIG. 18 are denoted by the corresponding or similar reference numerals, and will not be described in detail.

With the foregoing embodiment, the velocity-reduced drive system is compact, being able to suppress noises extensively. The flat motor and the velocity reduction unit are arranged along the cylindrical movable member to decrease a useless space around the device to which the drive system is applied, which is contributive to size reduction of such device.

APPLICABLE FIELDS

The velocity-reduced drive system of the invention is suitable to operate a movable member of a video camera or a combined-camera-and-VTR unit.

What is claimed is:

1. A velocity-reduced drive system comprising:
   (a) a motor housed in at least one case of a plurality of cases; and
   (b) a reduction gear unit including a worm gear rotatably supported by at least two of said cases, first power transmission means for transmitting rotational force of said motor to said worm gear, and second power transmission means for transmitting the rotational force of said worm gear to an output shaft, said second power transmission means including a worm wheel meshed with said worm gear.

2. A velocity-reduced drive system according to claim 1, wherein said first power transmission means includes pulleys fitted over a drive shaft of said motor and a shaft of said worm gear, respectively, and an endless belt trained over said pulleys, and said second power transmission means includes a gear train.

3. A velocity-reduced drive system according to claim 1, wherein said first power transmission means includes pulleys respectively fitted over a drive shaft of said motor and a first worm shaft of said worm gear, and an endless belt trained around said pulleys, and said second power transmission means includes a second worm shaft having an integrated worm wheel meshed with said worm gear, and a second worm wheel integral with said output shaft and engaged with a worm gear of said second worm shaft.

4. The velocity-reduced drive system of claim 1, wherein one of said plurality of cases is a housing for said motor.

5. The velocity-reduced drive system of claim 4, wherein said one of said plurality of cases which houses said motor is connected to another of said plurality of cases, and further wherein a remainder of said plurality of cases other than said one house said reduction gear unit.

6. The velocity-reduced drive system of claim 4, wherein said plurality of cases includes first and second cases which rotatably support said worm gear, and wherein said first power transmission means is disposed in said first case.

7. The velocity-reduced drive system of claim 6, wherein said first and second cases are fastened together.

8. The velocity-reduced drive system of claim 6, wherein said output shaft is supported by said first and second cases.

* * * * *